United States Patent
Schenk

(10) Patent No.: US 6,953,166 B2
(45) Date of Patent: Oct. 11, 2005

(54) DEVICE AND METHOD FOR TREATING EXCAVATED MATERIAL

(76) Inventor: Hans Jürgen Schenk, Haussmannstr. 34, 70188 Stuttgart (DE)

( * ) Notice: Subject to any disclaimer, the term of this patent is extended or adjusted under 35 U.S.C. 154(b) by 158 days.

(21) Appl. No.: 10/433,157

(22) PCT Filed: Nov. 29, 2001

(86) PCT No.: PCT/DE01/04460

§ 371 (c)(1), (2), (4) Date: May 30, 2003

(87) PCT Pub. No.: WO02/43867

PCT Pub. Date: Jun. 6, 2002

(65) Prior Publication Data

US 2004/0251356 A1 Dec. 16, 2004

(30) Foreign Application Priority Data

Nov. 30, 2000 (DE) .......................................... 100 59 407
Mar. 9, 2001 (DE) .......................................... 101 11 305

(51) Int. Cl.[7] ............................................... B02C 13/28
(52) U.S. Cl. ......................... 241/79; 241/187; 241/195; 241/236; 241/294
(58) Field of Search ................................. 241/187, 195, 241/189.1, 235, 236, 294, 79

(56) References Cited

U.S. PATENT DOCUMENTS

| 3,841,707 A | 10/1974 | Kniff et al. |
| 4,385,732 A | 5/1983 | Williams |

FOREIGN PATENT DOCUMENTS

| DE | 93 05 837 U | 9/1993 |
| DE | 198 13 877 A1 | 10/1999 |
| EP | 0 110 665 A2 | 6/1984 |
| GB | 2 094 662 A | 9/1982 |
| GB | 2 116 453 A | 9/1983 |
| WO | WO 96/29149 A1 | 9/1996 |

*Primary Examiner*—Mark Rosenbaum
(74) *Attorney, Agent, or Firm*—Venable LLP; Stuart I. Smith

(57) ABSTRACT

An apparatus suitable for treating mineral material, particularly excavated earth, has two rollers that rotate in opposite directions, on which a plurality of elements is disposed, the elements serving to transport and reduce the material in case its particle size is too large. Elements that are designed to exert a notch effect onto particle sizes larger than a minimum size are provided for reducing brittle and large-particle components of the mineral material, in particular. The reduction by means of the notch effect has been proven to save energy and subject machines to low wear. The elements that produce the notch effect can also reduce wood (tree stumps).

31 Claims, 8 Drawing Sheets

DEVICE AND METHOD FOR TREATING EXCAVATED MATERIAL

Figure 1:
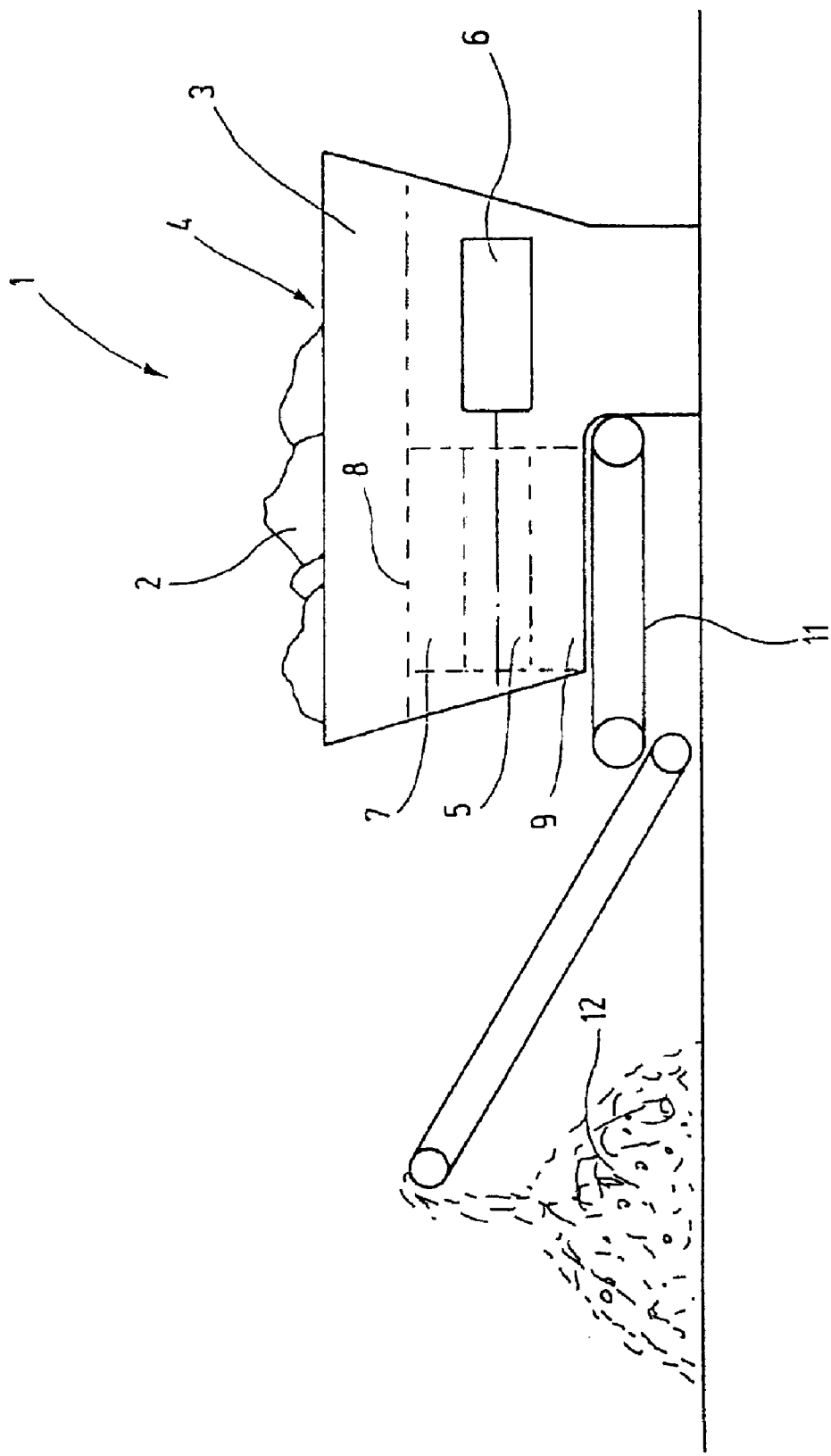

The invention relates to an apparatus and a method for treating excavated material, especially excavated earth.

When pits or trenches are dug in the earth or in stone, and when buildings or underground structures are demolished, the material that accumulates cannot be used directly in its present form. Therefore, in most cases, the material must be transported away and treated or disposed of elsewhere.

The constitution of excavated earth or stone and demolition material varies widely from case to case. In some instances, excavated earth can be cohesive, i.e., it may contain large quantities of loam and clay. Depending on the moisture content, such excavated material may have a tough, sticky or plastic consistency. Excavated sandy material, in contrast, is less tough and scarcely sticky. Regardless of this, the excavated material may contain small or large chunks of stone, pieces of road covering, such as asphalt or concrete, rock fragments, chunks of concrete, tree roots, tree stumps or the like. This type of excavated material generally cannot be reused on site, but must be removed.

In the process of obtaining materials and raw materials, it may be crucial to treat obtained (excavated) material before further using it. For example, it may be necessary to treat stone that is mixed with a cohesive material so that a maximum particle size is not exceeded. For this procedure, the first step is usually to separate the cohesive material from the stone components. After the stone has been reduced, it can be mixed with the loam and clay components again.

It may also be necessary to treat waste products; for example, in a foundry, sullage, sullage that has hardened in metal vessels, vitrified foundry sand or similar waste may have to be reduced and separated, for example into its various components.

In all of the above cases, it is necessary to employ a treating device that can process the aforementioned materials and is designed for these materials with respect to particle size and hardness. If these conditions are not met, known treating devices are limited.

In view of this, it is the object of the invention to create a versatile apparatus for treating material.

This object is accomplished with an apparatus according to claim 1, and a corresponding method.

The apparatus according to the invention permits the reduction and disintegration of a wide variety of materials, including mineral material, excavated earth, sullage, sullage that has hardened in metal vessels (metal and sullage separate in the reduction process), garbage, raw materials (salt), wood, recycling material, etc. In particular, it is possible to process mixtures comprising brittle, sticky, and plastic (cohesive) material. The apparatus also ensures that large-particle components such as stones, rocks, chunks of concrete or tree stumps present in the material can be reduced so far in one reduction cycle that their particle size does not exceed a desired maximum dimension. The maximum dimension can be set at, for example, 60 mm or another size, corresponding to the structure of the apparatus.

The apparatus can also be used to treat excavated earth that contains stones, without separating the materials in advance. The treated material can be reused as fill at the site. Stones contained in the material are reduced and mixed with cohesive earth components. The significant advantage of treating stone mixed with cohesive material, without a prior separation with the notch breaking mill according to the invention, is that the treated material can be used to create a weight-bearing foundation without the addition of binding agents.

The apparatus according to the invention has a feed device for feeding material to be treated. The feed device is formed by, for example, a funnel or a tub or another container that opens to the bottom and is provided on its underside with an opening that leads to the notch breaking mill. The notch breaking mill has at least two driven shafts that rotate in opposite directions, and on which wedge elements are disposed with spacing from one another. The wedges are provided with work surfaces that merely come into point-wise or linear contact with large objects, such as stones, that the material to be treated may contain, and thereby exert a notch effect. Adjoining the work surfaces are wedge surfaces that form an acute angle with one another and, when the shafts rotate, cut open the material into which they penetrate.

For this purpose, at least a few of the wedge elements are oriented such that their work surfaces (points) point essentially in the direction of the circumference of the shafts. This means that the points of the wedge elements point toward one another when they are located above the shafts on the side facing the feed device. As a result, coarser components of the material to be treated may jam briefly between the points (work surfaces) of the wedge elements moving in opposite directions, and the larger, brittle chunks are then broken merely through a point-wise introduction of force and the notch effect. The gap effect of the wedge elements is utilized here. Further wedge elements can be oriented differently.

The apparatus according to the invention reduces coarse components contained in the material to be treated. Coarse components are pieces whose particle size is larger than the desired maximum particle size for the material to be treated. In the apparatus of the invention, an exclusively large-surface contact between moving parts of the apparatus and coarse components is avoided because the wedge elements project so far from the shaft and all other elements moving with the shafts that only the work surfaces of the wedge elements touch a sphere whose diameter is larger than the maximum diameter of the desired final particle. Thus, only sharp elements interact with the coarse components. All blunt surfaces and elements are recessed from the sharp elements. This means that a receptacle is provided between the wedge elements, into which no other parts of the shafts protrude, and which is larger than the sphere described above. This allows coarse components of the material to fall so far between the shafts that the corresponding chunks are caught by the points of the wedge elements and can be split. To attain this, the wedge elements are held on radial protrusions that extend away from the shafts.

Some wedge elements can be arranged such that they point toward a surface (oppositely located shaft). Chunks that have moved between these are split by the notch effect of only one wedge element.

Unoccupied spaces are provided between the wedge elements moving in a common plane. This construction permits finer components of the material to be treated, i.e., components whose particle size is smaller than the maximum particle size, to be conveyed unimpeded between the shafts and not reduced. This saves drive energy and reduces tool wear.

In principle, it is possible to use an external force to supply the material, through a conveying device, to the notch breaking mill formed between the two shafts and the wedge elements secured to them. It is considered advantageous, however, simply to allow the material to be caught by the wedge elements because of the effect of its inherent weight. The shafts of the notch breaking mill can be disposed horizontally. As an alternative, they can be disposed at an incline or vertically. In a non-horizontal arrangement, it can be practical for the axial spacing of the wedge elements to be narrower at a lower position than at a higher position. The wedge elements can be offset from one another along a helical line for the purpose of conveying cohesive components downward. Fins or blades attached to the shafts can serve this purpose. Cohesive material is easily conveyed between the two shafts through their rotation in opposite directions. If individual components of the material to be treated are too large to be reduced into the desired, smaller particle sizes directly by the wedge elements, however, such components can initially remain on the shafts and their wedge elements without clogging or jamming the notch breaking mill. The stones or chunks of rock are supplied to the notch breaking mill merely through their inherent weight, for example, and can therefore be diverted or repelled upward by the wedge element numerous times until they land with a suitable surface between the wedge elements, and the reduction process begins. The process is executed by the arrangement of the wedge elements along a helical line.

If necessary, a press-down device, for example in the form of a heavy lid, can be provided above the notch breaking mill. This device prevents large, individual chunks from being repeatedly diverted upward from the notch breaking mill.

The feed device in accordance with the invention can be used as a granulating device. To this end, a randomly actuated seal in the form of two pivoting flaps, for example, can be provided beneath the notch breaking mill (which is a splitting device). The flaps are preferably embodied such that no clearance space is formed beneath the notch breaking mill. As a result, the material located in the notch breaking mill is not released for passage, but remains in the mill and is subjected to the effect of the wedge elements. If all components of the material mixture have been broken down to the point that they are smaller than the smallest tool-to-tool distance, and the smallest spacing between other elements moving toward one another, no further reduction is performed and the material can be released from the notch breaking mill through the opening of the flaps.

The shafts and the parts connected to them are spaced from one another by a distance that ensures that finer components of the material will not be further reduced. This is particularly because there are no crushing regions between the shafts in which large quantities of finer material can build up and be further reduced. Furthermore, the oppositely rotating shafts effect a very strong conveying action, which likewise counteracts the buildup of material if the material has a large clay component and is moist.

The feed device can have a dispensing device in addition to the notch breaking mill; this device is designed to dispense additives into the material mixture. The dispensing device is preferably disposed in the immediate vicinity of the notch breaking mill, and continuously introduces the additive into the material flow. This assures an extensively uniform distribution of the additives. The dispensing device has an additive-conveying device, which is connected to corresponding dispensers (nozzles). The nozzles are provided, for example, on a girder disposed above or below the breaking mill. Additives may be liquids or powdered materials, such as unhydrated lime.

A plurality of notch or wedge elements can be provided on each shaft. They can be arranged in groups, for example, with axial spacing from one another, in which instance the wedge elements of each group are disposed in one plane, for example, and define a circle with their work surfaces (points).

The circles ultimately denote the point or work-surface diameter of the wedge-element groups. Groups having different diameters can be provided, with spacing from one another, on one shaft. In a preferred arrangement, the groups having smaller point diameters on adjacent shafts mesh with one another, while the groups having a larger point diameter have no counterpart on the oppositely located shaft, but extend into corresponding gaps. Consequently, particularly large chunks are only taken up by a few wedge elements, for example three wedge elements of the groups that have a large point diameter, and may be spaced axially from one another, so the force exerted by the wedge elements is only concentrated on two or three force-introduction points on the chunks to be reduced. Thus, a very high notch and breaking effect can be attained, even for large chunks, with relatively low drive torques and drive output. Finally, chunks of medium-hard and hard stone can be reduced without difficulty.

The wedge elements are preferably detachably connected to the shafts. This allows the wedge elements to be exchanged, if necessary. If they are worn, the apparatus can be rendered operational again in a short time simply through the installation of new wedge elements. The wedge elements are preferably produced from hard metal or a comparable material. They are preferably conical; the cone can be graduated. This means that the conical angle is slightly larger immediately adjoining the point, and the cone then becomes narrower further from the point. As an alternative, the wedge elements may be frustoconical, possibly with a rounded point. Further alternatives include embodiments of the wedges as flat wedges having a knife-shaped point, or as pyramids. If the wedge elements are pyramidal, the edges and the point may be rounded. It is likewise possible to embody the wedges as graduated pyramids, so a slightly larger wedge angle is formed at the point, and adjoining this, a slightly smaller wedge angle, between the corresponding flanks of the wedge element.

Blade elements can be provided between the wedge elements; these can be embodied as straight or curved plates and extend essentially radially away from the shaft. The blade elements serve in conveying clay-containing material, especially material whose moisture content makes it very sticky.

The wedge elements are preferably disposed such that at least some of them project radially past the blade elements. This means that their work surfaces (points) define a larger diameter than the blade elements. This permits coarse components such as tree stumps, stone chunks or large stones to be taken up only by the wedge elements, not by the blade elements.

The wedge elements are preferably rigidly (although detachably) connected to the shafts. In this preferred embodiment, the elements cannot execute a deflection movement. This means that, in any case, the material to be reduced must give in order for the reduction process to actually take place. To assure overload protection, the drive device can include an overload safeguard, and change its direction of rotation if it exceeds a maximum torque. This can be realized with hydraulic drive devices. The reversal in the direction of rotation re-orients the object to be reduced, so the wedge elements impact the material at different locations with each change in the direction of movement. The material is normally reduced immediately, even if the direction of rotation of the shafts has already been completely blocked.

The reversal in the direction of rotation (reversing) can be effected exclusively based on load, or additionally on a periodic basis, particularly for breaking up the material lying around the notch breaking mill.

The drive device is preferably embodied such that the wedge elements have a rotating speed of less than 3.5 m/s. In an embodiment for very coarse material (e.g. >400 mm), the speed of the fastest wedge elements, that is, the ones held on the largest diameter, is less than 1.5 m/s, for example only 95 cm/s or less. At such a low speed, the wedge elements do not impact the stones hard, but merely come into contact with them and immediately subject them to a notch effect.

It is also advantageous for scraping elements to be provided on the rear sides of the shafts (the side facing away from the respective other shaft), the elements being inclined with respect to the horizontal and being disposed such that their top is slightly higher than the axes of rotation of the shafts. These scraping and removal elements prevent chunks of stone or other large objects located on the notch breaking mill from becoming wedged in the notch breaking mill or between the grinding mechanism and a wall of the feed device when the drive direction is reversed. Instead, the chunks are pushed away laterally, and diagonally upward, from the notch breaking mill and are reduced.

It is considered especially advantageous to connect a few wedge elements, particularly (external) wedge elements that are disposed on a large radius, to a pneumatic percussion device, or to provide them with a pneumatic percussion device. If this is the case, when the wedge elements encounter resistance, they can execute a percussive movement in their longitudinal direction. The percussive energy transmitted to the stone enhances the notch effect, and improves the reduction process, which also allows very large stones to be treated.

In an advantageous modification of the invention, a separating device, for example in the form of a roller grate, is a component of the treating device. The separating device is disposed beneath the notch breaking mill, for example, and can be used to separate stones or other objects exceeding a maximum size out of the material mixture.

Further details about the advantageous embodiments of the invention ensue from the drawing, the following description and the dependent claims.

Figure 2:
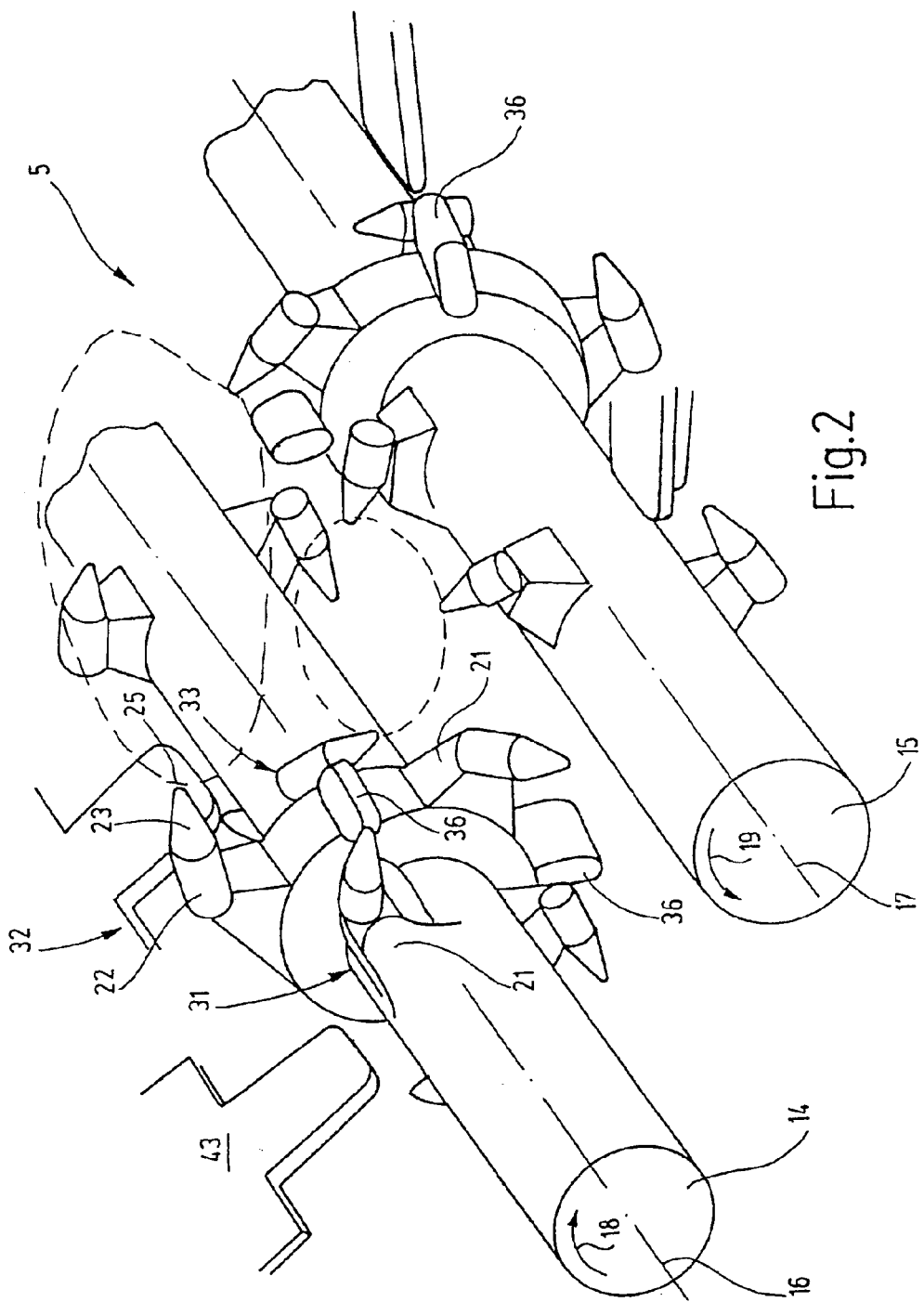
Figure 3:
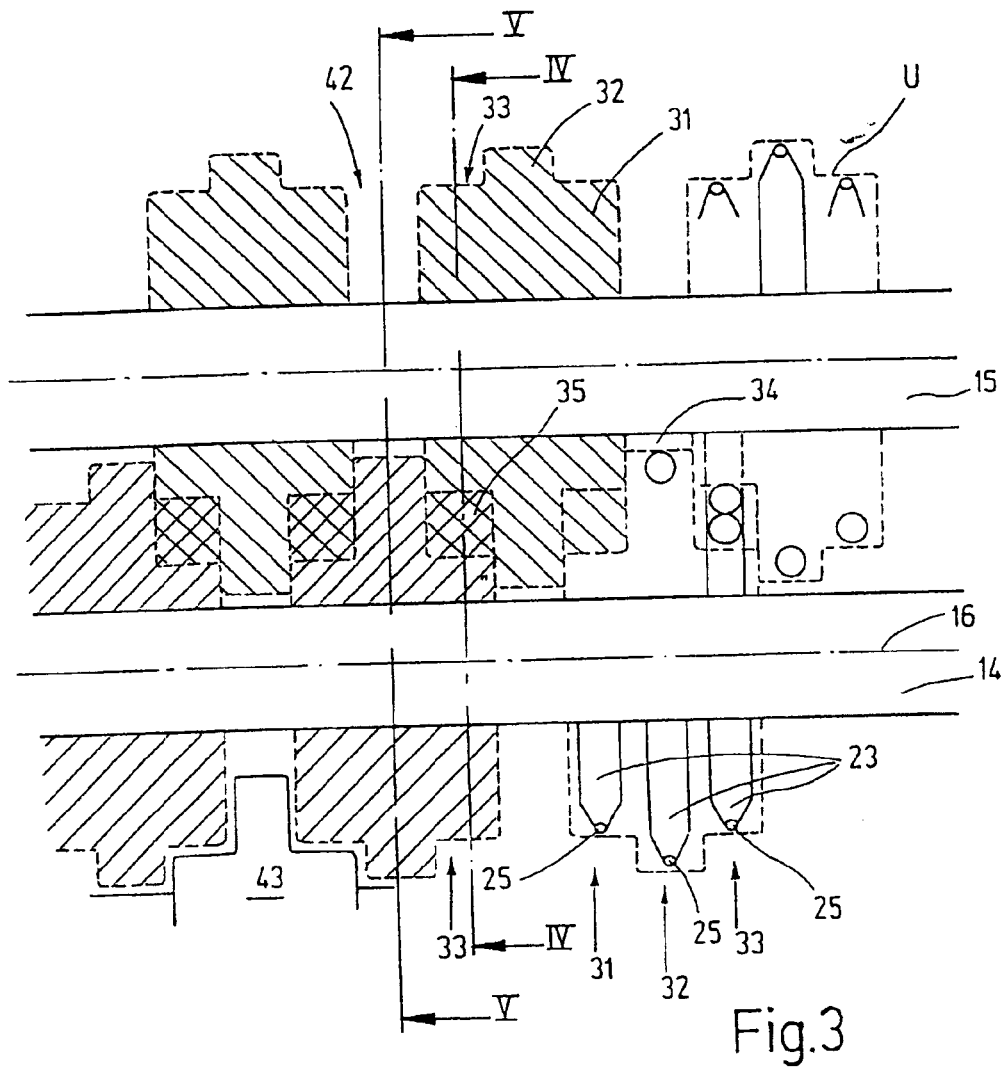
Figure 4:
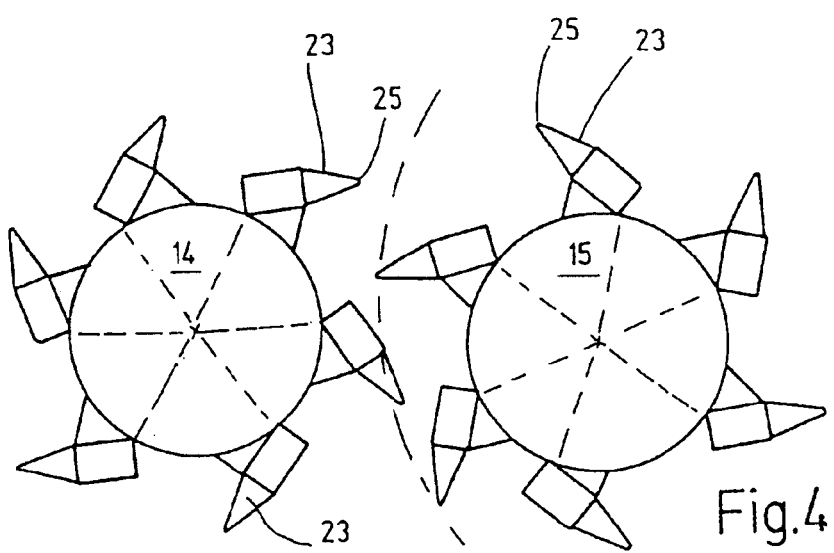
Figure 5:
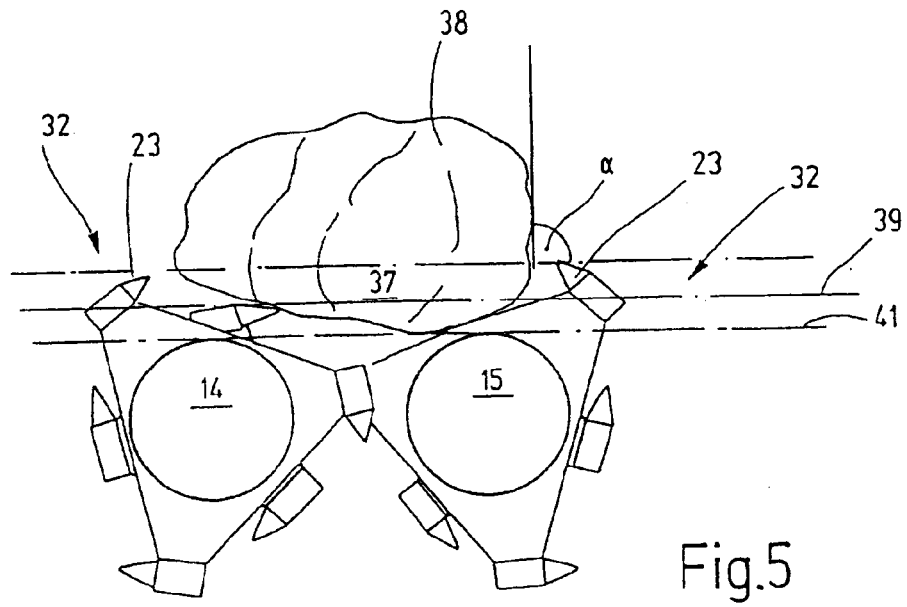
Figure 6:
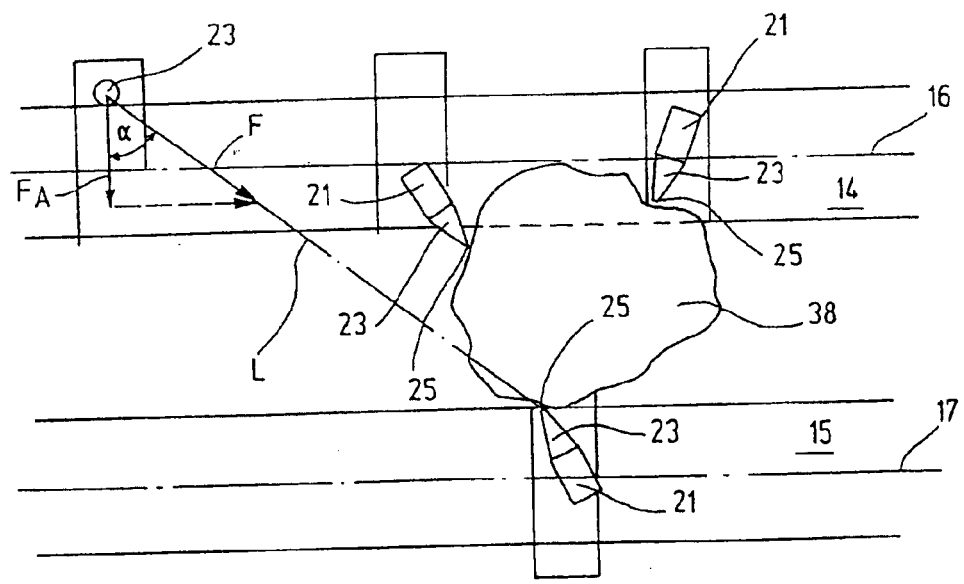
Figure 7:
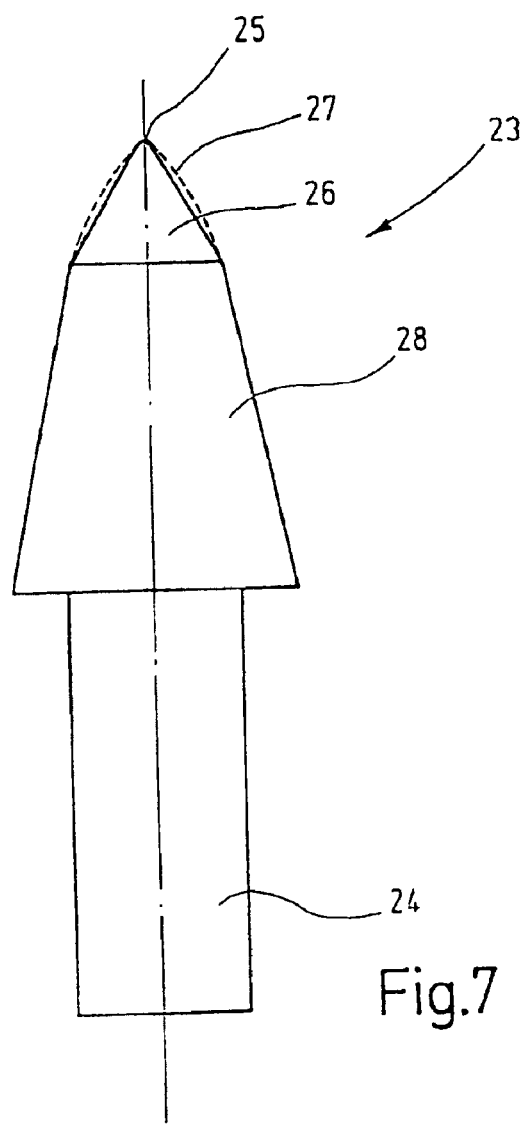
Figure 8:
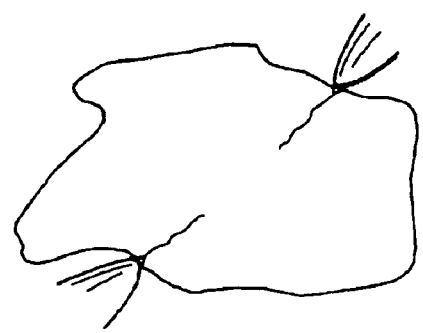
Figure 9:
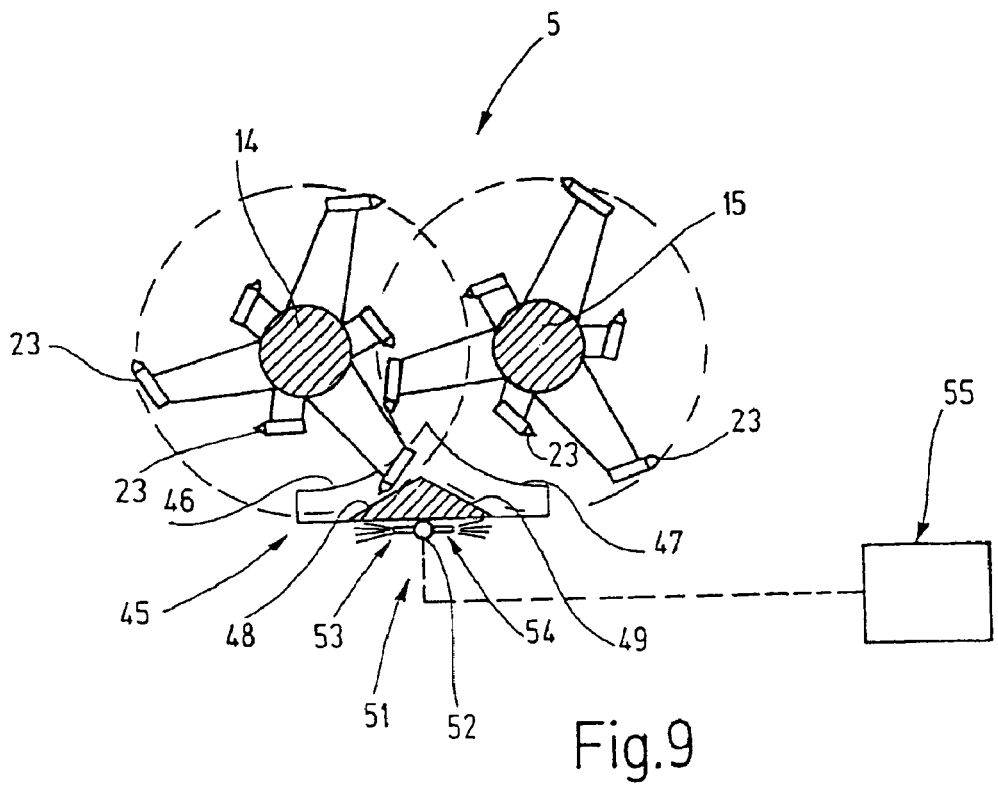
Figure 10:
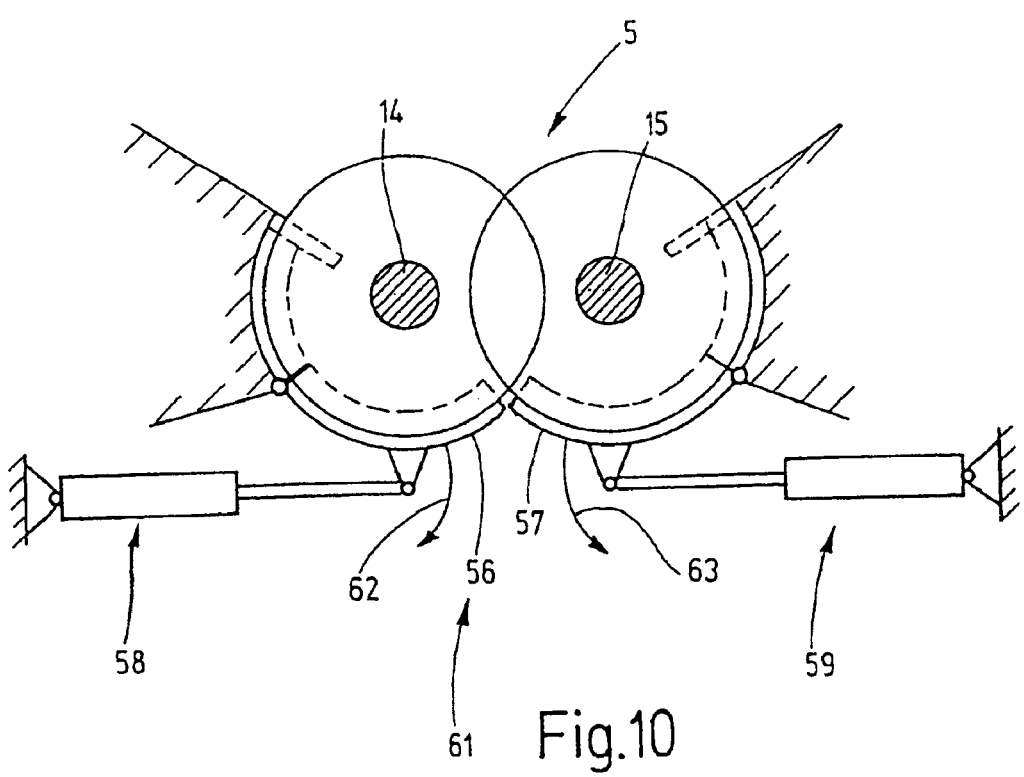
Figure 11:
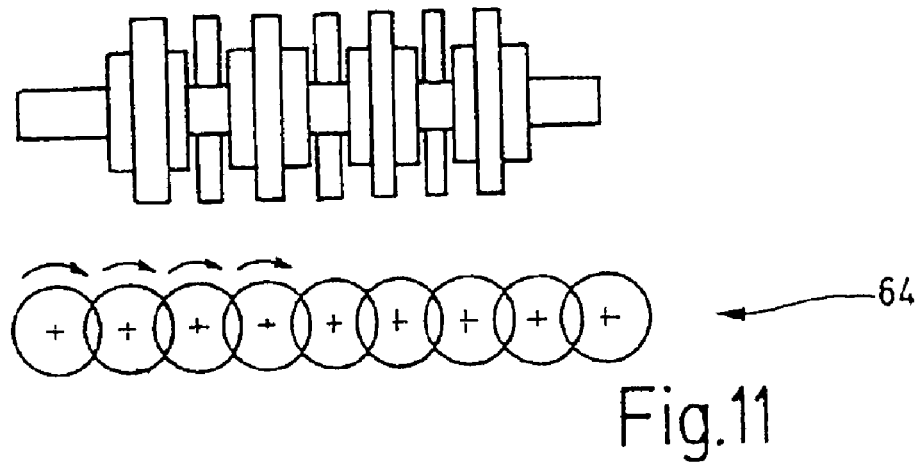
Figure 12:
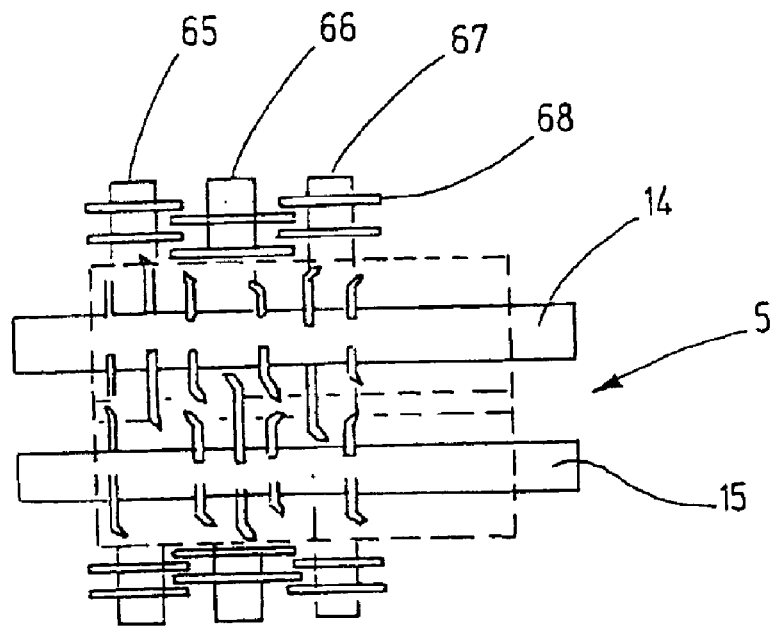
Figure 13:
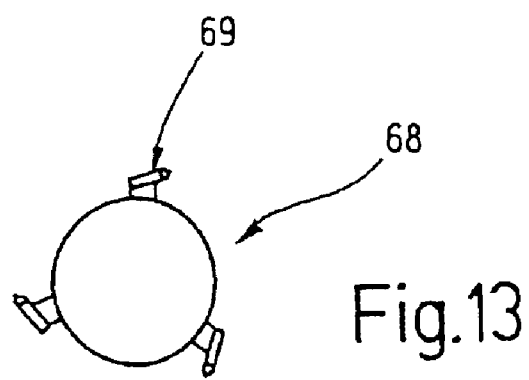
Figure 14:
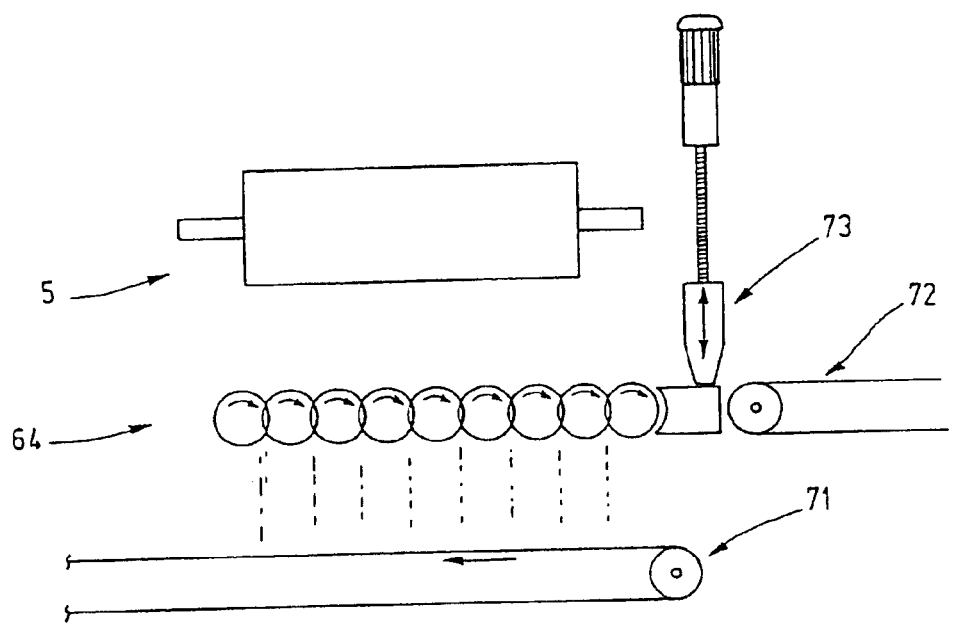
Figure 15:
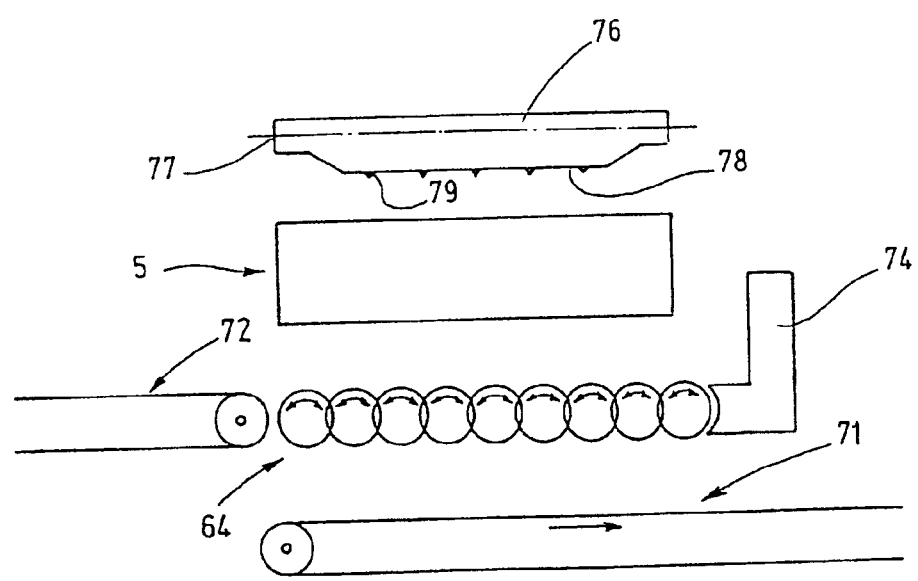

The drawings illustrate an exemplary embodiment of the invention. Shown are in:

FIG. 1 the apparatus of the invention in a schematic representation;

FIG. 2 a cracking mechanism of the apparatus according to FIG. 1, in a sectional, perspective representation;

FIG. 3 the cracking mechanism according to FIG. 2, in a schematic, plan view;

FIG. 4 the cracking mechanism according to FIG. 3, in a simplified representation, and in section along the line IV—IV;

FIG. 5 the cracking mechanism according to FIG. 3, in a simplified representation and in section along the line V—V;

FIG. 6 the cracking mechanism according to FIG. 3, in a simplified, plan view;

FIG. 7 a wedge element of the apparatus according to FIGS. 1 through 6;

FIG. 8 the effect of wedge elements on a stone;

FIG. 9 the cracking mechanism according to FIG. 2, having a crushing beam and a dispensing device for additives;

FIG. 10 a modified embodiment of the invention having a cracking mechanism as the mixing device;

FIG. 11 a schematic view of the combination of the cracking mechanism and a separating device in the form of a disk separator;

FIG. 12 a plan view of the arrangement according to FIG. 11;

FIG. 13 a perspective view of a disk element of the disk separator according to FIGS. 11 and 12;

FIG. 14 a schematic view of a first embodiment of a treating device having a cracking mechanism and a separator; and FIG. 15 a schematic representation of a second embodiment of a treating device having a cracking mechanism and a separator.

FIG. 1 illustrates an apparatus 1 for treating excavated earth 2 or other material that at least partially comprises minerals. The apparatus 1 has a housing 3, whose upper part is embodied as a flat tub 4 that is open at the top. This tub 4 constitutes a feed device to be filled with the material 2 to be treated. In other words, the material 2 is fed into the tub 4 by, for example, an excavator or a conveyor belt.

The housing 3 accommodates a notch breaking mill (cracking mechanism) 5, which is driven by a drive device 6, such as a diesel motor, only shown schematically. The notch breaking mill 5 is disposed in a passageway 7 that extends from a floor opening 8 in the tub 4 to a discharge opening 9, under which a conveyor-belt device 11 is disposed. The conveyor-belt device serves in carrying off treated material 12.

FIG. 2 shows the notch breaking mill 5 in greater detail. The mill has two shafts 14, 15, which are seated to rotate about axes of rotation 16, 17 and are driven in opposite directions by the drive device 6. The directions of rotation are indicated by arrows 18, 19.

In the present example, the shafts 14, 15 are spaced from another by a distance that approximately corresponds to the shaft diameter, or is slightly larger than the shaft diameter.

Holders 21 are mounted to the shafts 14, 15, and extend essentially radially away from the shafts 14, 15. On their outside, the holders 21 have a receptacle 22 for each wedge element 23. The receptacles 22 are embodied, for example, as hollow cylinders, and hold a cylindrical shaft 24 of the wedge element 23 shown separately in FIG. 7. This element is conical, for example, and as shown in FIG. 7, has a sharp or rounded point 25. Starting from the point 25 is a conical jacket surface 26, which, as shown, may be embodied as a straight circular cone or, as indicated by a dashed line 27 in FIG. 7, as a curved cone. At least the point 25, and possibly the jacket surface 26, forms or form a work surface, with which the wedge element 23 comes into initial, point-wise contact with a chunk of stone or another object to be reduced. A narrower jacket surface 28 adjoins the first jacket surface, thereby forming the flank of the wedge element 23 and splitting the material of the chunk to be reduced radially toward the inside and outside, relative to the rotating shaft 14, 15. In contrast to reducing devices such as shredders and the like, the wedge elements 23 of the apparatus 1 according to the invention, which are oriented in the direction of the circumference, split the material through the notch and wedge effects; forces arising at the flanks of the wedge elements 23 are oriented extensively radially, relative to the shafts 14, 15.

As can be seen in FIG. 2, the wedge elements 23 are disposed in groups 31, 32, 33 on the shafts 14, 15. For clarification, refer to FIG. 3, in which the outlines of the groups 31, 32, 33 are shown in dashed lines. The groups 32 each include three wedge elements 23—if needed, more or fewer wedge elements 23 can be provided in each group 31, 32, 33. The groups 31, 33 each contain six wedge elements 23. A grouping of three wedge elements 23 is considered advantageous, however, because it results in the desired spacing between the wedge elements 23. The wedge elements of the group 31 are disposed closely to the shafts 14, 15, i.e., their holders 21 are relatively short. The points 25 of these wedge elements 23 are oriented toward the respectively opposite shaft 14, 15. In comparison, the holders 21 of the wedge elements 23 of the group 32 are relatively long. The holders 21 of the group 33 are, again, relatively short. Thus, the points 25 of the wedge elements 23 of the group 33 define a relatively large circle. The circle is so large that only a relatively small gap 34 remains between the points 25 of this group 32 and the respectively opposite shaft (15). The points 25 of the group 32 are preferably disposed in one plane, or in a narrow, disk-shaped region perpendicular to the axis of rotation 16. Preferably, no wedge element is disposed on the shaft 15 opposite the group 32, that is, in the same plane. The wedge elements of the group 32 are oriented approximately tangentially so that they can receive large stones between them. This is also permitted over an axial distance because of unoccupied spaces between the wedge elements 23.

The groups 31, 33 have a smaller outside diameter; in other words, the points 25 of their wedge elements 23 lie on a slightly smaller circle. On the opposite shaft 15, a group 31 of wedge elements 23 is disposed at the same axial height (in the same plane), the elements having essentially the same diameter. The diameters of the groups 31 are dimensioned such that they overlap. The same is true for the groups 33, as shown in FIG. 3 by a cross-hatched region 35, and separately in FIG. 4. This region 35 forms an inner reducing region, indicated by dashed lines in FIG. 4. In this region, the flight paths of the points 25 of the wedge elements 23 intersect. The drive device 6 drives the shafts 14, 15 in opposite directions, at the same speed and locked in phase, so the wedge elements 23 of the two groups 33 extend into the gaps between the wedge elements of the other shaft. The wedge elements 23 do not touch one another, although they both pass through the region 35.

As shown in FIG. 2, blade elements 36, which are formed by essentially radially oriented, straight plates, can be provided between the wedge elements 23. The blade elements 36 are preferably disposed between the wedge elements 23 of the group 32; they are radially further inward than the wedge elements 23. The outer circumferential surface of each blade element 36 has a smaller radius, relative to the axis of rotation 16, than the spacing between the point 25 and the axis of rotation 16.

As can particularly be seen from FIG. 5, a large receptacle 37 can be created between the wedge elements 23 of two axially offset groups 32, the elements facing one another. Bodies such as stones 38 or the like to be reduced can enter this receptacle. As is apparent from FIG. 5, the empty receptacle 37 extends at least up to a height 39, which is specified by the diameters of the smaller groups 31, 33, and partially up to a height 41, which is specified by the top sides of the shafts 14, 15. The receptacle 37 can also extend between the shafts 14, 15.

As can be seen from FIGS. 2 and 3, three groups 31, 32, 33 on each shaft 14, 15 form a unit, with a gap 42 being located between two units formed from three groups; the blade of one group 32 of an oppositely located grouping on the other shaft extends into this gap. Scraping elements 43, in the form of correspondingly shaped blades or webs that are stationary and disposed above the axes of rotation 16, 17, extend into these gaps. The scraping elements 43 perform a dual function. On the one hand, they serve to scrape cohesive material from the shafts 14, 15; on the other hand, they prevent stones from becoming wedged between the shafts 14, 15 and stationary parts when the drive device 6 reverses. For this purpose, the scraping elements 43 are preferably inclined toward the shafts 14, 15.

The scraping elements 43 have an extension, which projects into the intermediate space 42. If necessary, the extension can be shortened so that further wedge elements that are connected to the shafts 14, 15 can be disposed in the intermediate space 42, the wedge elements rotating in a circle and meshing with the wedge elements 23 of the group 32.

As shown in FIG. 6, the wedge elements 23 are disposed at an incline relative to a plane extending perpendicular to the respective axis of rotation 16, 17. Furthermore, adjacent wedge elements 23 of a shaft 14, 15 are offset from one another. This can be advantageous for reducing large stones 38. As indicated by a dot-dash line L, this permits stones to be received between axially spaced wedge elements of the shafts 14, 15, and split with very high forces F. The force F exerted on the stone is calculated as $F=FA/\cos \alpha$, and becomes extremely large when the line L extends approximately parallel to the shafts, 14 and 15 and the drive forces are small. Brittle chunks are broken up in this manner. A significant advantage, however, lies in the facilitated manual access to the respective rear side, i.e., the side of the holders 21 opposite the point 25. This facilitates the exchange of the wedge elements 23, during which it may be necessary to have access to the relevant rear side.

The apparatus 1 described to this point operates as follows:

During operation, the material 2 is fed into the tub 4, thereby loading the notch breaking mill 5 with its inherent weight. The drive device 6 rotates the shafts 14, 15 in opposite directions such that the wedge elements 23 at the top, that is, those facing away from the tub 4, move toward one another. The rotating speed of the shafts 14, 15 is about 25 rpm. If coarse material (>400 mm) is to be processed, the rotating speed of the wedge elements 23 may be about 60 cm/s. As long as the particle size of the material 2 is small enough to allow the material to pass through the gaps between the shafts 14, 15 and the elements rotating with them, the material is conveyed between the shafts 14, 15 and carried off via the conveyor-belt device 11. Larger pieces, such as the stone 38 shown in FIGS. 5 and 6, enter the receptacle 37 because of their inherent weight; as shown in FIG. 6, they are taken up point-wise by wedge element 23 of the opposite shafts 14, 15. The points 25 of the wedge elements 23 now exert a notch effect on the stone 38. The point-wise introduction of force effects a stress concentration at the relevant area on the stone that causes a crack to propagate through the stone 38 (as illustrated in FIG. 8); the cracks originating from the wedge elements 23 cause the stone 38 to be broken into plurality of pieces. If the broken pieces are small enough, they fall between the shafts 14, 15. Otherwise, the wedge elements 23 of the smaller groups 31,33 break up the pieces again in a similar manner, through the notch effect.

The concentration of forces onto linear or point-shaped regions of the surface of the stone 38 causes the stress limit of the stone material to be exceeded point-wise, thereby creating a crack that propagates through the stone (notch effect). The necessary drive torques are therefore not too high, so no overly large drive outputs become necessary.

If the material to be treated contains sand or pebbles, it falls through unimpeded between the shafts 14, 15. Cohesive material is reduced, depending on its moisture content. If material containing clay or loam (cohesive) is dry, larger pieces such as stones can be split with little effort. If the material is moist and sticky, the blade elements 36 reduce it into appropriately small pieces, that is, it is broken up, and falls through between the shafts 14, 15.

FIG. 9 illustrates a modified embodiment of the cracking mechanism 5. The shafts 14, 15 and the elements they support correspond to those of the cracking mechanism 5 according to FIG. 2. A crushing beam 45 having an approximately triangular cross-section is disposed beneath the cracking mechanism 5. On its side facing the wedges 23, the crushing beam 45 has curved surfaces 46, 47, 48, 49, which are curved approximately at a constant distance from the adjacent tool 23 rotating past. Correspondingly, the surfaces 46, 47 lie on smaller radii than the surfaces 48, 49. The surfaces 46, 47 are associated with the tools 23 held on the short holders, while the surfaces 48, 49 are associated with the wedges 23 held on the long holders.

In the embodiment according to FIG. 9 and the embodiment according to FIG. 10, the metering of additives can be effected as a function of moisture, for example. The pumping and metering device is connected to a moisture-measuring device, not shown in detail, which is disposed on the cracking mechanism 5. The additive can be supplied directly into the cracking mechanism 5, for example through corresponding channels in the shafts 14, 15.

The crushing beam can improve the breaking effect of the cracking mechanism 5, and reliably permit the reduction of coarse components down to a relatively small particle size of about 60 mm with relatively few wedges 23 on the shafts 14, 15.

If necessary, a dispensing device 51 can be provided beneath the crushing beam, the device including a line 52 with one or a plurality of openings 53, 54 or nozzles. A liquid or powdered additive can be fed into the material flow via this line 52 and the openings 53, 54. A pump and metering device 55 attached to the line 52 serves this purpose. Additives may include chemical liquids, suspensions, fibrous liquids or fluidized powders. The additives may serve in stabilizing moisture, solidification, sealing the material or other purposes.

It is also possible to supply additives such as lime (CaO), in powdered or granular form, to the material prior to feeding it into the cracking mechanism 5. Other possible additives include cement, ashes, stone dust, granulates, fibers (cellulose), wood chips, sawdust, suspensions (lime), bentonite and sealing suspensions.

The mixing of the additive and the material to be treated, and/or the granulation of the material, can be further improved with an embodiment in accordance with FIG. 10. In this embodiment, two pivoting flaps 56, 57 are disposed beneath the cracking mechanism 5, only indicated schematically; the flaps, with their pivot drives 58, 59, form a device 61 for regulating the passage of material. The flaps 56, 57 are seated to pivot about pivoting axes oriented parallel to the shafts 14, 15. The shape of the flaps 56, 57 is adapted to the outer contour of the cracking mechanism 5, so no clearance volume is established below the cracking mechanism 5, in which large quantities of material could build up. Thus, when the flaps 56, 57 are closed, all of the fed-in material is held in the cracking mechanism 5 and continuously and thoroughly processed. This can improve the disintegration process and the mixing and homogenization of the material, especially when additives are used. Through the suitable control of the actuating devices 58, 59, the flaps 56, 57 can be opened from time to time, as indicated by arrows 62, 63, for releasing the processed material. Slide elements or other block-and-release devices may also be used in place of flaps.

As shown in FIGS. 11 and 12, the cracking mechanism 5 can be connected to a separating device 64. The separating device is formed, for example, by a disk separator that encompasses a plurality of parallel shafts 65, 66, 67. The shafts are parallel and spaced from one another, and are driven in the same direction, and at the same rotational speed, for example. If needed, the rotational speeds of the shafts 65, 66, 67 can also increase in the material-transport direction. The shafts 65, 66, 67 are disposed beneath the shafts 14, 15, and extend perpendicular thereto. As an alternative, a different orientation can be selected. Disk elements 68 can be held, fixed against relative rotation, on the shafts 65, 66, 67. FIG. 13 shows one disk element 68 as a representative for all of the disk elements. The element can have one or more tools 69 at its circumference, which serve in material transport, further reduction, and the transport of the fine component through the space defined between the shafts 65, 66, 67.

The combination of the cracking mechanism 5 and the separating device 64 shown in FIGS. 11 and 12 can be implemented in a treatment system, as shown in FIGS. 14 and 15. In accordance with FIG. 14, a conveyor-belt device 71 is provided below the disk separator 64 for transporting off the fine portion that has dropped from the separating device 64. A further conveyor-belt device 72 adjoining the separating device 64 serves in transporting off the separated coarse component. A motor-actuated sliding element 73 or a flap is provided between the separating device 64 and the conveyor-belt device 72; this element is opened from time to time to release coarse components.

In the embodiment according to FIG. 15, the shafts of the separating device 64 are driven to rotate alternately forward and backward, in the same direction at the same time. As shown in FIG. 15, in normal separating operation, the shafts rotate clockwise, and therefore convey material to the right. Whereas the fine portion is transported off by the conveyor-belt device 71 beneath the separating device 64, coarse components collect at a barrier wall 74. For transporting out the coarse component, the shafts reverse their direction of rotation and convey to the left in FIG. 15, namely toward the conveyor-belt device 72. For the majority of their operating time, the shafts rotate clockwise at a speed of 300 rpm, for example. They form a grading device. The brief reversal takes place from time to time, and only lasts long enough to convey the coarse component from the barrier wall 74 to the conveyor-belt device 72.

As in all of the other embodiments, if necessary, a lid 76 can be provided above the cracking mechanism 5, thereby forming a press-down device. The lid 76 is seated to rotate about a pivot axis 77, or move in another manner, and is connected to an actuating device, not shown in detail. The lid 76 has a relatively large mass, and is provided on its underside 78 with teeth 79 or other protrusions.

A device suited for treating mineral material, especially excavated earth, has two rollers, which rotate in opposite directions, and on each of which a plurality of elements 23 is disposed for conveying and reducing the material if its particle size is too large. For reducing brittle and large-particle components of the mineral material, in particular, the device has elements 23, which are designed for exerting a notch effect onto particles larger than a minimum size. The reduction through the notch effect has been proven to save energy and subject machines to low wear. The elements 23 that exert the notch effect can also reduce wood (tree stumps).

What is claimed is:
1. An apparatus (1) for treating material, comprising:
a feed device (4), which is provided with a receiving opening for feeding the material;

at least two shafts (14, 15), which are disposed parallel to one another and are seated to rotate, and are connected to a drive device (6) that is designed to set the shafts (14, 15) into a rotational movement in opposite directions; and elements (23) for exerting a notch effect on brittle components of the material to be reduced, the elements being connected to the shafts (14, 15) for forming cracking mechanism (5), wherein the elements (23) that exert a notch effect are disposed in groups at locations on the shafts (14, 15) that are axially spaced (16, 17) from one another, the elements (23) of a group (31, 32, 33) that exert a notch effect are disposed on a circle that is coaxial relative to the shaft (14, 15), and the elements (23) of adjacent groups (31, 32, 33) that exert a notch effect are disposed on circles having different diameters.

2. The apparatus according to claim 1, wherein the shafts (14, 15) are disposed in a passageway (7) disposed on the underside of the feed device (4).

3. The apparatus according to claim 1, wherein the shafts (14, 15) are spaced from one another such that neither they nor any parts connected to them touch.

4. The apparatus according to claim 1, wherein each shaft (14, 15) has a plurality of elements (23) for exerting the notch effect.

5. The apparatus according to claim 4, wherein the elements (23) that exert a notch effect are permanently attached to the shafts (14, 15).

6. The apparatus according to claim 1, wherein the elements (23) that exert a notch effect are detachably connected to the shafts (14, 15).

7. The apparatus according to claim 1, wherein each group (32) having a large diameter is adjacent to at least one group (31, 33) having a smaller diameter.

8. The apparatus according to claim 1, wherein each group (32) having a large diameter has on both sides at least one group (31, 33) having a smaller diameter.

9. The apparatus according to claim 1, wherein the notch-effect-exerting elements (23) of one group (32) of one shaft (14) extend into gaps (42) between groups (31, 33) of the other shaft (15).

10. The apparatus according to claim 1, wherein no elements for exerting a notch effect are disposed at the location on a shaft (14) opposite a group (32) of elements (23) for exerting a notch effect.

11. An apparatus (1) for treating material, comprising:

a feed device (4), which is provided with a receiving opening for feeding the material;

at least two shafts (14, 15), which are disposed parallel to one another and are seated to rotate, and are connected to a drive device (6) that is designed to set the shafts (14, 15) into a rotational movement in opposite directions; and elements (23) for exerting a notch effect on brittle components of the material to be reduced, the elements being connected to the shafts (14, 15) for forming a cracking mechanism (5), wherein blade elements (36) are held or embodied on the shafts (14, 15).

12. The apparatus according to claim 11, wherein the elements (23) for exerting a notch effect project past the blade elements (36) in the radial direction.

13. The apparatus according to claim 1, wherein the elements (23) that exert a notch effect are embodied identically among themselves.

14. The apparatus according to claim 1, wherein the elements (23) that exert a notch effect are conical.

15. The apparatus according to claim 1, wherein the elements (23) that exert a notch effect each have a wedge angle at their flanks (26, 28) measuring less than 90°.

16. The apparatus according to claim 1, wherein the elements (23) that exert a notch effect have rounded points (25).

17. An apparatus (1) for treating material, comprising:

a feed device (4), which is provided with a receiving opening for feeding the material;

at least two shafts (14, 15), which are disposed parallel to one another and are seated to rotate, and are connected to a drive device (6) that is designed to set the shaft (14, 15) into a rotational movement in opposite directions; and elements (23) for exerting a notch effect on brittle components of the material to be reduced, the elements being connected to the shafts (14, 15) for forming a cracking mechanism (5), wherein the elements (23) that exert a notch effect are oriented at an incline relative to a plane to which the axis of rotation (16, 17) of the shaft (14, 15) extends perpendicular.

18. An apparatus (1) for treating material, comprising:

a feed device (4), which is provided with a receiving opening for feeding the material;

at least two shafts (14, 15), which are disposed parallel to one another and are seated to rotate, and are connected to a drive device (6) that is designed to set the shafts (14, 15) into a rotational movement in opposite directions; and elements (23) for exerting a notch effect on brittle components of the material to be reduced, the elements being connected to the shafts (14, 15) for forming a cracking mechanism (5), wherein receptacles (37) for the material to be reduced, which extend at least up to the shafts (14, 15), are provided between the elements (23) of adjacent shafts (14, 15), the elements exerting a notch effect and pointing toward one another.

19. The apparatus according to claim 1, wherein the elements (23) that exert a notch effect are oriented such that the corresponding wedge elements (23) impact the material (38) to be reduced at essentially a 90° angle.

20. The apparatus according to claim 1, wherein a sorting device is disposed upstream of the apparatus, and/or a sorting device or a measuring device is disposed downstream of the apparatus.

21. The apparatus according to claim 1, wherein the drive device (6) is embodied such that the rotating speed of the elements (23) for exerting a notch effect is less than 3.5 m/s when the fed-in material does not exceed a maximum particle size of 400 mm, and is less than 1.0 m/s when the maximum particle size is larger.

22. The apparatus according to claim 1, wherein the drive device (6) is embodied to reverse as a function of time and/or load.

23. The apparatus according to claim 1, wherein at least some of the elements are connected to a percussion device.

24. The apparatus according to claim 1, wherein a dispensing device (51) is provided on the cracking mechanism (5) for the metered supply of additives into the material flow.

25. The apparatus according to claim 1, wherein a device (61) for controlling the passage of material is provided beneath the cracking mechanism (5).

26. The apparatus according to claim 25, wherein the device (61) is formed by flaps that can pivot toward and away from the cracking mechanism (5).

27. The apparatus according to claim 1, wherein a separating or grading device (64) is disposed downstream of the cracking mechanism (5).

28. The apparatus according to claim 27, wherein the separating device (64) is a disk separator or a roller grate.

29. The apparatus according to claim 28, wherein the disk separator has disks (68), which are provided with tools (69) or teeth.

30. The apparatus according to claim 1, wherein a press-down device (76) is associated with the cracking mechanism (5).

31. The apparatus according to claim 30, wherein the press-down device (76) is provided with a percussive device, or perform a percussive function itself.

* * * * *